United States Patent
Li et al.

(10) Patent No.: US 11,949,309 B2
(45) Date of Patent: Apr. 2, 2024

(54) LINEAR VIBRATION MOTOR WITH CASING HAVING COPPER RING AND VIBRATION UNIT WITH MAGNETIC STEEL ASSEMBLY

(71) Applicant: AAC Microtech (Changzhou) Co., Ltd., Changzhou (CN)

(72) Inventors: Ziang Li, Shenzhen (CN); Zhiyong Cui, Shenzhen (CN); Yan Shao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 38 days.

(21) Appl. No.: 17/833,759

(22) Filed: Jun. 6, 2022

(65) Prior Publication Data

US 2023/0198364 A1    Jun. 22, 2023

(30) Foreign Application Priority Data

Dec. 17, 2021    (CN) .......................... 202123203982.9

(51) Int. Cl.
*H02K 33/04*    (2006.01)

(52) U.S. Cl.
CPC .................................... *H02K 33/04* (2013.01)

(58) Field of Classification Search
CPC ........ H02K 35/00; H02K 35/02; H02K 33/00; H02K 33/02; H02K 33/04; H02K 33/06; H02N 11/00; H02N 11/002; H02N 11/04
USPC .. 310/29, 12.12, 12.01, 12.03, 12.13, 12.16, 310/12.26, 15–25
See application file for complete search history.

(56) References Cited

U.S. PATENT DOCUMENTS 5,231,336 A * 7/1993 van Namen ........... F16F 7/1011
                                                         318/128
5,973,422 A * 10/1999 Clamme ................ H02K 33/16
                                                         310/90.5

(Continued)

FOREIGN PATENT DOCUMENTS

CN    104617736 B  *  8/2017  ............. H02K 33/16
CN    208589899 U  *  3/2019  ............. H02K 33/10

(Continued)

OTHER PUBLICATIONS

CN-104617736-B English Translation (Year: 2017).*

*Primary Examiner* — Maged M Almawri
(74) *Attorney, Agent, or Firm* — W&G Law Group

(57) ABSTRACT

The present disclosure provides a linear vibration motor, including a casing with an accommodation space, a vibration unit accommodated in the accommodation space, a vibration unit suspended in the accommodation space and a coil fixed on the casing and driving the vibration unit to vibrate. The casing includes a copper ring arranged around the vibration unit. In the linear vibration motor provided by the utility model, the copper ring is arranged around the vibration unit to provide a damping function for the linear vibration motor. Compared with the foam damping member in the related art, the linear vibration motor provided by the present disclosure may be arranged by an automatic device during the production and manufacture of the linear vibration motor, thereby greatly improving the production efficiency, and improving the automation degree.

5 Claims, 4 Drawing Sheets

(56) References Cited

U.S. PATENT DOCUMENTS

| | | | | |
|---|---|---|---|---|
| 6,983,923 B2* | 1/2006 | Fukui | ............... | F16K 31/082 335/229 |
| 7,078,832 B2* | 7/2006 | Inagaki | ............... | H02K 7/14 335/238 |
| 7,671,493 B2* | 3/2010 | Takashima | ............... | G06F 3/016 310/15 |
| 7,791,456 B2* | 9/2010 | Miura | ............... | B06B 1/045 340/407.1 |
| 8,013,480 B2* | 9/2011 | Bang | ............... | B06B 1/045 310/12.33 |
| 8,097,991 B2* | 1/2012 | Masami | ............... | H02K 33/16 310/15 |
| 8,188,623 B2* | 5/2012 | Park | ............... | H02K 33/16 310/12.01 |
| 8,278,786 B2* | 10/2012 | Woo | ............... | H02K 33/16 310/15 |
| 8,288,899 B2* | 10/2012 | Park | ............... | H02K 33/16 310/71 |
| 8,575,794 B2* | 11/2013 | Lee | ............... | H02K 33/18 310/15 |
| 9,461,530 B2* | 10/2016 | Wasenczuk | ............... | B06B 1/04 |
| 9,473,854 B2* | 10/2016 | Yasuike | ............... | H04R 1/028 |
| 9,815,085 B2* | 11/2017 | Chun | ............... | G06F 3/016 |
| 9,906,109 B2* | 2/2018 | Endo | ............... | H02K 33/16 |
| 10,630,142 B2* | 4/2020 | Kanaya | ............... | H02K 33/02 |
| 10,778,075 B2* | 9/2020 | Mao | ............... | H02K 33/12 |
| 10,855,156 B2* | 12/2020 | Matsuyama | ............... | H02K 33/16 |
| 2003/0102739 A1* | 6/2003 | Yoneyama | ............... | H02K 33/06 310/81 |
| 2003/0146825 A1* | 8/2003 | Kaneda | ............... | H04M 1/03 381/396 |
| 2004/0119343 A1* | 6/2004 | Ueda | ............... | G10K 9/22 310/12.31 |
| 2006/0002577 A1* | 1/2006 | Won | ............... | B06B 1/045 381/396 |
| 2007/0085425 A1* | 4/2007 | Hirashima | ............... | H02K 33/16 310/15 |
| 2007/0182257 A1* | 8/2007 | Miura | ............... | H04R 9/02 310/23 |
| 2009/0033157 A1* | 2/2009 | Maemura | ............... | H02K 41/03 310/12.25 |
| 2009/0320219 A1* | 12/2009 | Takahashi | ............... | H02K 33/16 15/21.1 |
| 2011/0018364 A1* | 1/2011 | Kim | ............... | H02K 33/18 310/20 |
| 2011/0018365 A1* | 1/2011 | Kim | ............... | B06B 1/045 310/20 |
| 2011/0062803 A1* | 3/2011 | Lee | ............... | H02K 33/18 310/29 |
| 2011/0068640 A1* | 3/2011 | Choi | ............... | H02K 5/04 310/25 |
| 2011/0089773 A1* | 4/2011 | Choi | ............... | H02K 33/16 310/25 |
| 2011/0133577 A1* | 6/2011 | Lee | ............... | H02K 33/18 310/15 |
| 2011/0193426 A1* | 8/2011 | Chung | ............... | H02K 33/16 310/25 |
| 2011/0193427 A1* | 8/2011 | Lemieux | ............... | F03G 7/08 310/25 |
| 2011/0198948 A1* | 8/2011 | Keisuke | ............... | H02K 5/225 310/25 |
| 2011/0198949 A1* | 8/2011 | Furuich | ............... | H02K 33/16 310/25 |
| 2011/0254385 A1* | 10/2011 | Makino | ............... | H02K 41/03 310/12.14 |
| 2011/0291497 A1* | 12/2011 | Choi | ............... | H02K 33/18 310/25 |
| 2012/0032535 A1* | 2/2012 | Park | ............... | H02K 35/02 310/25 |
| 2012/0039491 A1* | 2/2012 | Katz | ............... | H04R 9/022 381/150 |
| 2012/0098380 A1* | 4/2012 | Wang | ............... | H02K 15/0442 310/260 |
| 2012/0109029 A1* | 5/2012 | Ma | ............... | H04R 11/02 310/16 |
| 2012/0169148 A1* | 7/2012 | Kim | ............... | H02K 33/16 310/25 |
| 2012/0293022 A1* | 11/2012 | Park | ............... | B06B 1/045 310/25 |
| 2013/0033128 A1* | 2/2013 | Yoon | ............... | H02K 33/18 310/25 |
| 2013/0033129 A1* | 2/2013 | Hong | ............... | B06B 1/045 310/25 |
| 2013/0043766 A1* | 2/2013 | Takahashi | ............... | H04R 17/00 310/326 |
| 2013/0076162 A1* | 3/2013 | Papakyriacou | ............... | B06B 1/045 267/153 |
| 2013/0099600 A1* | 4/2013 | Park | ............... | B06B 1/045 310/15 |
| 2013/0285479 A1* | 10/2013 | Kinoshita | ............... | H02K 35/02 310/12.12 |
| 2013/0342037 A1* | 12/2013 | Kawarai | ............... | H02K 35/02 310/30 |
| 2014/0062225 A1* | 3/2014 | Kim | ............... | H02K 33/00 310/15 |
| 2014/0103751 A1* | 4/2014 | Furukawa | ............... | H02K 35/02 310/25 |
| 2014/0132089 A1* | 5/2014 | Jeon | ............... | H02K 33/18 310/14 |
| 2015/0172821 A1* | 6/2015 | Lee | ............... | H04R 9/046 381/410 |
| 2015/0194870 A1* | 7/2015 | Kim | ............... | H02K 33/18 310/25 |
| 2015/0295485 A1* | 10/2015 | Sutani | ............... | H02K 15/03 310/12.18 |
| 2015/0296280 A1* | 10/2015 | Lee | ............... | B06B 3/00 381/412 |
| 2016/0149517 A1* | 5/2016 | Choi | ............... | H02N 1/04 427/58 |
| 2016/0149518 A1* | 5/2016 | Wang | ............... | F03B 13/14 310/310 |
| 2016/0190903 A1* | 6/2016 | Ohishi | ............... | H02K 35/04 310/28 |
| 2017/0033653 A1* | 2/2017 | Wang | ............... | H02K 33/16 |
| 2017/0033673 A1* | 2/2017 | Wang | ............... | H02K 33/16 |
| 2017/0144191 A1* | 5/2017 | Mao | ............... | B06B 1/045 |
| 2017/0288523 A1* | 10/2017 | Katada | ............... | H02P 25/032 |
| 2017/0328441 A1* | 11/2017 | Kanaya | ............... | F16F 13/26 |
| 2017/0346376 A1* | 11/2017 | Kim | ............... | H02K 15/02 |
| 2018/0026514 A1* | 1/2018 | Mao | ............... | H02K 5/225 310/12.16 |
| 2018/0297074 A1* | 10/2018 | Huang | ............... | B06B 1/045 |
| 2019/0157958 A1* | 5/2019 | Mao | ............... | H02K 33/12 |
| 2019/0267882 A1* | 8/2019 | Matsuyama | ............... | H02K 33/02 |
| 2020/0304005 A1* | 9/2020 | Mao | ............... | H02K 33/16 |
| 2021/0328491 A1* | 10/2021 | Takahashi | ............... | H02K 33/06 |
| 2022/0123642 A1* | 4/2022 | Takahashi | ............... | B06B 1/045 |
| 2022/0140717 A1* | 5/2022 | Neubauer | ............... | H02K 33/16 310/28 |

FOREIGN PATENT DOCUMENTS

| | | | | |
|---|---|---|---|---|
| CN | | 110266171 A | * 9/2019 | ............... H02K 1/34 |
| WO | WO-2012153631 A1 | * 11/2012 | | ............... B06B 1/045 |

* cited by examiner

A–A

US 11,949,309 B2

LINEAR VIBRATION MOTOR WITH CASING HAVING COPPER RING AND VIBRATION UNIT WITH MAGNETIC STEEL ASSEMBLY

TECHNICAL FIELD

The present disclosure relates to a motor, in particular to a linear vibration motor applied in the field of mobile electronics.

BACKGROUND

With the development of electronic technologies, portable consumer electronic products are more and more sought after by people, such as mobile phones, handheld game consoles, navigation devices or handheld multimedia entertainment devices. These electronic products generally adopt linear vibration motors for system feedback, such as a call prompt, an information prompt, a navigation prompt, and a vibration feedback from game consoles in the mobile phone. Such a wide range of applications requires a good vibration performance of the vibration motor.

In the related art, the linear vibration motor is provided with a foam to provide damping, and the linear vibration motor with this structure has the following defects. In the method, the foam is manually inserted into the linear vibration motor, which has low production efficiency and low degree of automation. Besides, the driving force is small since it is Ampere force.

Therefore, it is necessary to provide a product to solve the above-mentioned problems.

SUMMARY

An object of the present disclosure is to provide a linear vibration motor with large driving force and good vibration performance.

In order to achieve the above-mentioned object, the present disclosure provides a linear vibration motor, comprising: a casing with an accommodating space, a vibration unit accommodated in the accommodating space, an elastic member suspending the vibration unit in the accommodating space and a coil fixed to the casing and driving the vibration unit to vibrate; wherein the casing comprises a copper ring arranged around the vibration unit.

In some embodiments, the coil is attached to a side of the copper ring close to the vibration unit.

In some embodiments, the vibration unit comprises a magnetic steel assembly, wherein the magnetic steel assembly comprises a plurality of first magnetic steels arranged along a vibration direction of the vibration unit, the first magnetic steels are magnetized along a direction perpendicular to the vibration direction of the vibration unit, magnetization directions of two adjacent first magnetic steels are opposite, and the plurality of the first magnetic steels together form a magnetic circuit.

In some embodiments, the first magnetic steel are ring-shaped magnetic steels, and the first magnetic steels are magnetized in a radial direction.

In some embodiments, the vibration unit further comprises a mass block sandwiched between two adjacent first magnetic steels and an annular connecting member connecting the first magnet steels and the elastic member.

In some embodiments, the annular connecting member comprises a body connected to the first magnetic steels and a connecting portion welded and fixed to the elastic member.

In some embodiments, the casing, the vibration unit, the coil and the elastic member are coaxially arranged.

Compared with the foam damping member in the related art, the linear vibration motor provided by the present disclosure may be arranged by an automatic device during the production and manufacture of the linear vibration motor, thereby greatly improving the production efficiency, and improving the automation degree.

BRIEF DESCRIPTION OF THE DRAWINGS

In order to describe the technical solutions in the embodiments of the present disclosure more clearly, accompanying drawings required to be used in the descriptions of the embodiments will be briefly introduced below. Obviously, the drawings in the illustration below are merely some embodiments of the present disclosure. Those ordinarily skilled in the art also can acquire other drawings according to the provided drawings without doing creative work.

DETAILED DESCRIPTION OF THE EMBODIMENTS

The technical solutions in the embodiments of the present disclosure will be described clearly and completely below with reference to the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Figure 1:
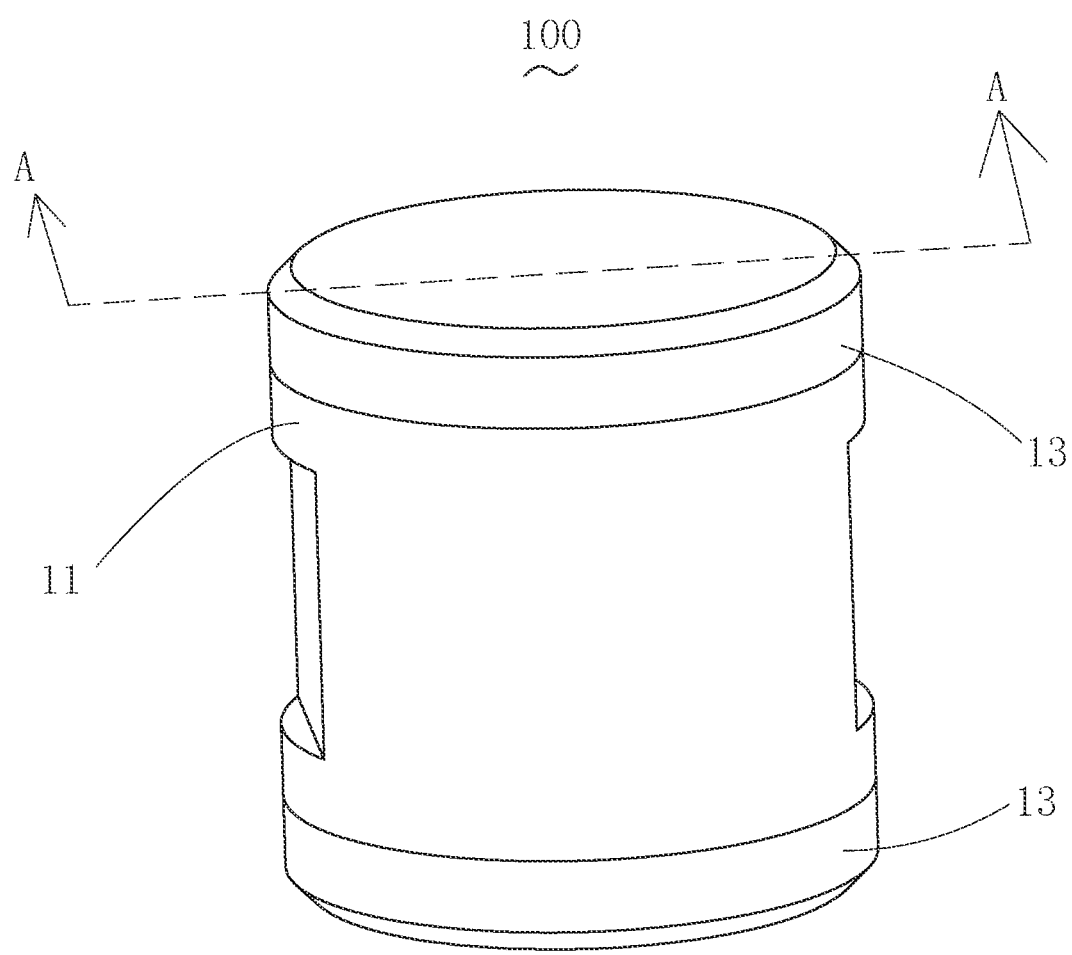
FIG. 1 is a three-dimensional structure diagram of a linear vibration motor according to the present disclosure.
Figure 2:
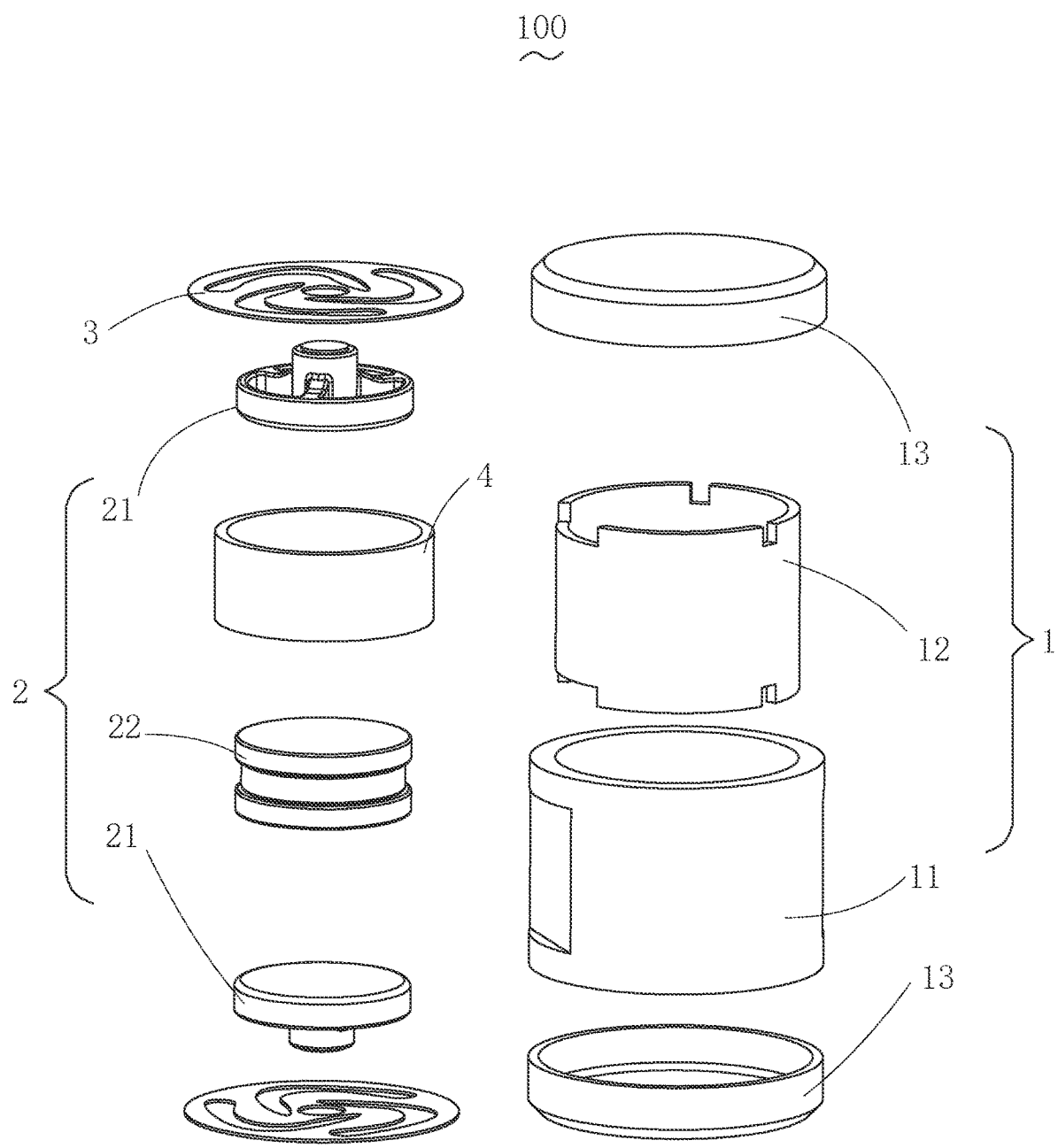
FIG. 2 is an exploded view of the three-dimensional structure of the linear vibration motor according to the present disclosure.
Figure 3:
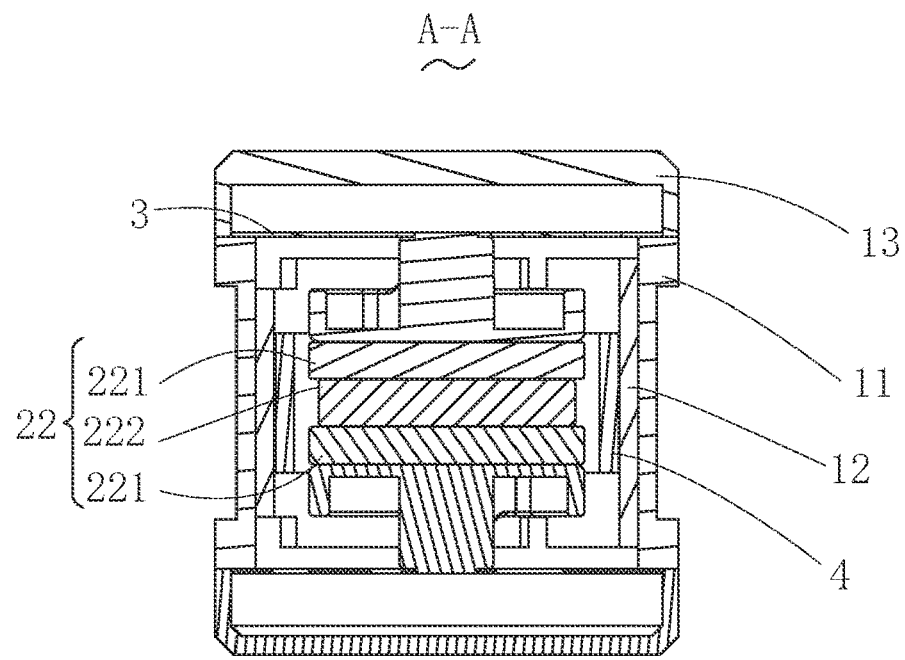
FIG. 3 is a sectional view along a line A-A in FIG. 1.
Figure 4:
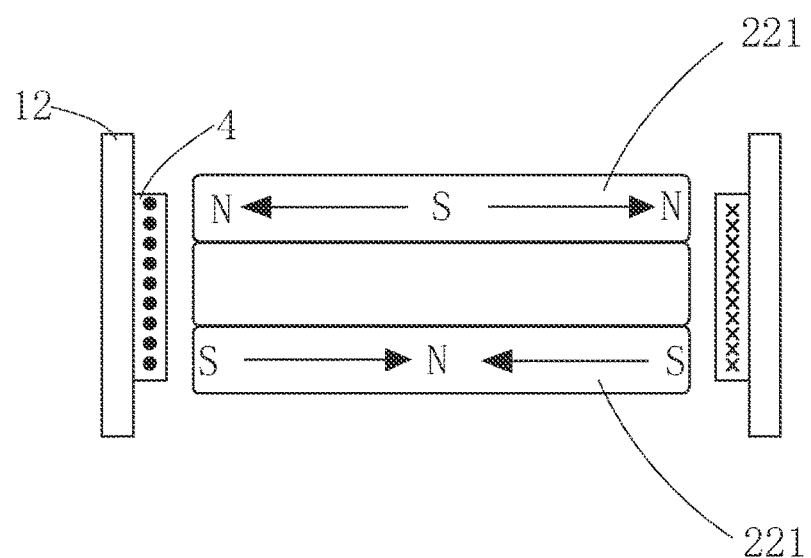
FIG. 4 is a schematic diagram illustrating a state that the linear vibration motor vibrates along one direction according to the present disclosure.

Referring to FIGS. 1-3, the present disclosure provides a linear vibration motor 100, which includes a casing 1 with an accommodating space 10, a vibration unit 2 accommodated in the accommodating space 10, a vibration unit 2 accommodated in the accommodating space 10, an elastic member 3 suspending the vibration unit 2 in the accommodating space 10, and a coil 4 fixed to the casing 1 and driving the vibration unit 2 to vibrate. The casing 1, the vibration unit 2, the coil 4 and the elastic member 3 are coaxially arranged. The casing 1 includes a cylindrical casing body 11 with a through hole, a copper ring 12 coaxially arranged with the casing body 11 and attached to an inner side of the casing body 11, and a cover body 13 connected to both ends of the through hole. The casing body 11 and the cover body 13 together enclose the accommodating space 10. In an embodiment, the casing body 11 may be made of magnetically conductive material, so as to improve utilization rate of an internal magnetic field of the linear vibration motor.

It can be understood that the copper ring 12 is arranged around the vibration unit 2, so that when the vibration unit 2 moves relative to the copper ring 12, the copper ring 12 cuts the magnetic field lines by itself, and an eddy current is formed through the electromagnetic induction. According to the Lenz's law, a direction of the magnetic field generated by the eddy current is always opposite to a direction of the original magnetic field, so as to effectively increase a damping effect of the vibration unit 2, which is electromagnetic damping. Besides, the copper ring 12 used as the element to provide damping may be arranged by automated equipment in the production of the motor, so that the production efficiency and the automation degree are high.

As shown in FIGS. 2-5, the vibration unit 2 includes a magnetic steel assembly 22, and the magnetic steel assembly includes two annular first magnetic steels 221 arranged at intervals and a mass block 222 sandwiched between the two adjacent annular first magnetic steels 221, and a connecting ring 23 connected to the magnetic steel assembly 22 and the elastic member 3. The two first magnetic steels 221 are magnetized in the radial direction and together form a magnetic circuit. Through this arrangement, the magnetic field strength of the linear vibration motor 100 can be greatly improved, thereby improving the driving force of vibration and enhancing the vibration sense of the linear vibration motor 100. In this embodiment, an inner side in the radial direction of one of the first magnetic steels 221 is an S pole and an outer side in the radial direction thereof is an N pole. An inner side in the radial direction of the other one of the first magnetic steels 221 is an N pole and an outer side in the radial direction thereof is an S pole.

Figure 5:
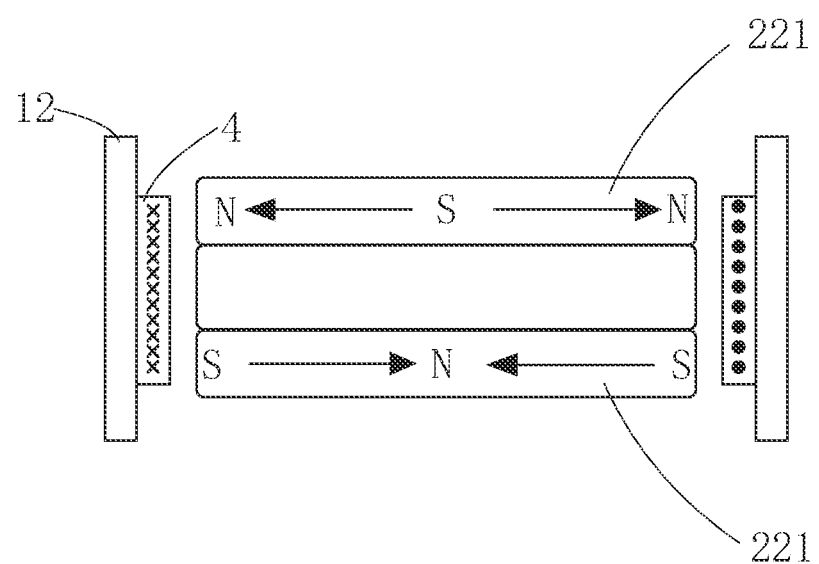
FIG. 5 is a schematic diagram illustrating another state that the linear vibration motor vibrates along one direction according to the present disclosure.

The coil 4 is attached to a side of the copper ring 12 close to the vibration unit 2. When the linear vibration motor 100 is working, according to a left-hand rule of ampere force, the current in the coil is energized in a direction shown in FIG. 4, according to the principle that the action force is opposite to the reaction force, the vibration unit 2 generates a downward ampere force, and then drives the vibration unit 2 to move upward. Similarly, when the energization direction of the coil 4 changes as shown in FIG. 5, the vibration unit 2 is driven downward by the coil to move downward, and so on, thereby realizing a vibration function of the linear vibration motor 100.

Compared with the foam damping member in the related art, the linear vibration motor provided by the present disclosure may be arranged by an automatic device during the production and manufacture of the linear vibration motor 100, thereby greatly improving the production efficiency, and improving the automation degree.

The above descriptions are only embodiments of the present disclosure. It should be pointed out herein that for those of ordinary skill in the art, improvements may be made without departing from the inventive concept of the present disclosure, but these all belong to the protection scope of the present invention.

What is claimed is:

1. A linear vibration motor, comprising:
a casing with an accommodating space;
a vibration unit accommodated in the accommodating space;
an elastic member suspending the vibration unit in the accommodating space; and
a coil fixed to the casing and driving the vibration unit to vibrate;
wherein the casing comprises a copper ring arranged around the vibration unit;
the vibration unit comprises a magnetic steel assembly, wherein the magnetic steel assembly comprises a plurality of first magnetic steels arranged along a vibration direction of the vibration unit, the first magnetic steels are magnetized along a direction perpendicular to the vibration direction of the vibration unit, magnetization directions of two adjacent first magnetic steels are opposite, and the first magnetic steels together form a magnetic circuit the vibration unit further comprises a mass block sandwiched between two adjacent first magnetic steels and an annular connecting member connecting the first magnet steels and the elastic member.

2. The linear vibration motor of claim 1, wherein the coil is attached to a side of the copper ring close to the vibration unit.

3. The linear vibration motor of claim 1, wherein the casing, the vibration unit, the coil and the elastic member are coaxially arranged.

4. The linear vibration motor of claim 1, wherein the first magnetic steels are ring-shaped magnetic steels, and the first magnetic steels are magnetized in a radial direction.

5. The linear vibration motor of claim 4, wherein the annular connecting member comprises a body connected to the first magnetic steels and a connecting portion welded and fixed to the elastic member.

\* \* \* \* \*